Figure 1:
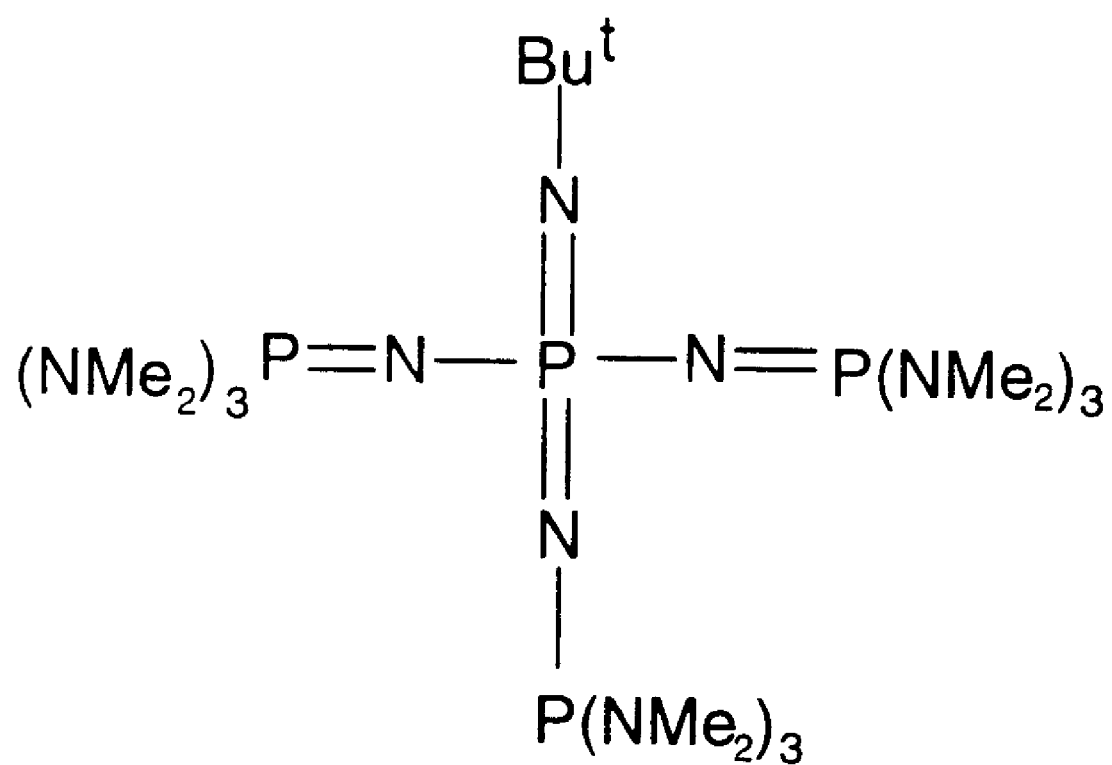

United States Patent [19]
Harkness et al.

[11] Patent Number: 6,001,928
[45] Date of Patent: Dec. 14, 1999

[54] POLYMERISATION OF CYCLOSILOXANES IN THE PRESENCE OF FILLERS

[75] Inventors: Brian Harkness, Cowbridge; Richard Taylor, Barry, both of United Kingdom

[73] Assignee: Dow Corning Limited, South Wales, United Kingdom

[21] Appl. No.: 09/027,157

[22] Filed: Feb. 20, 1998

[30] Foreign Application Priority Data

Feb. 20, 1997 [GB] United Kingdom .................. 9703552

[51] Int. Cl.⁶ .......................... C08G 77/08; C08K 5/5399
[52] U.S. Cl. .......................... 524/858; 524/709; 524/860; 528/21; 528/23
[58] Field of Search .................. 524/858, 709; 528/21, 23

[56] References Cited

U.S. PATENT DOCUMENTS

| | | | |
|---|---|---|---|
| 4,431,771 | 2/1984 | Falender et al. | 524/863 |
| 4,448,927 | 5/1984 | Falender et al. | 524/860 |
| 4,482,670 | 11/1984 | Saam et al. | 524/860 |
| 5,138,008 | 8/1992 | Montague et al. | 528/21 |
| 5,210,129 | 5/1993 | Habimana et al. | 528/21 |
| 5,334,688 | 8/1994 | Loo | 528/21 |

FOREIGN PATENT DOCUMENTS 0 119 092  9/1984  European Pat. Off. .

OTHER PUBLICATIONS

Poly Prep ACS, Div. Polym. Chem, 1996, vol. 37, pp. 668–669.
Macromol. Rapid Commun. 16, pp. 449–453 (1995).
Angew. Chem. Int. Ed. Engle, 1993, 32, No. 9, pp. 1361–1363.
Schwesinger et al., Liebigs Ann. 1996, 1055–1081.
Molenberg and Moller, Maromol Rapid Commun. 16, 449–453 (1995).
Van Dyke and Clarson in Poly Prep ACS Div. Ploym Chem 1996, 37,668.

*Primary Examiner*—Tae Yoon
*Attorney, Agent, or Firm*—Jennifer S. Warren; William F. Boley

[57] ABSTRACT

A process for which making silicone-filler mixtures which comprises effecting the ring-opening polymerisation of a cyclosiloxane with a phosphazene base in the presence of a filler and of water, preferably from 0.5 mil to 10 mols of water per mol of phosphazene base. The filler is preferably selected from silica, alumina, titanium dioxide, carbon black and calcium carbonate, present in an amount of from 1 to 200 parts by weight per 100 parts by weight of cyclosiloxane. An agent or conditions which inhibit catalyst activity may initially be present (e.g. carbon dioxide or excess water), and polymerisation may be initiated by reducing the effect of the inhibiting agent or conditions (e.g. by heating). Silicon-elastomers produced by curing such silicone polymer-filler mixtures are also claimed.

17 Claims, 1 Drawing Sheet

POLYMERISATION OF CYCLOSILOXANES IN THE PRESENCE OF FILLERS

This invention relates to the ring-opening polymerisation of cyclosiloxanes in the presence of fillers and catalysed by phosphazene bases.

Cyclosiloxanes are critical intermediates in the silicone industry, primarily as starting monomers for polymerisation. Several general routes are known for the preparation of cyclosiloxanes. Together with hydroxy-endblocked linear polydiorganosiloxanes, they are formed as a product of hydrolysis of the corresponding diorganodihalosilanes. Mixtures of cyclic and/or linear polydiorganosiloxanes can also be equilibrated or "cracked" by reaction in the presence of a catalyst such as a base to form an equilibrium mixture of more desired cyclics and linears.

Various catalysts are known for the polymerisation of cyclosiloxanes. Examples are alkali metal hydroxides, alkali metal alkoxides or complexes of alkali metal hydroxides and an alcohol, alkali metal silanolates, and phosphonitrile halides (sometimes referred to as acidic phosphazenes). Such polymerisations can be carried out in bulk, in solvents (such as non-polar or polar organic solvents) or in emulsion. An endblocking agent may be used to regulate the molecular weight of the polymer and/or to add functionality. Polymerisation may be terminated by using a neutralizing agent which reacts with the catalyst to render it non-active. In most cases catalyst residues remain in the polymer product and are desirably removed, such as by filtration.

Silicone polymer-filler mixtures are used as a base for various silicone rubber compositions, silicone compounds and greases, etc. These mixtures are generally produced by first polymerising silicone oligomer into a silicone polymer with the desired viscosity and then mechanically mixing the resulting silicone polymer with the selected filler. However, such methods involve two different types of processes, necessitating a separate polymerisation step and mixing step.

As a result, the process is complicated and disadvantageous on a cost basis. In addition, it is difficult in such methods to mix and disperse filler into high-viscosity silicone polymers and large amounts of energy are consumed. This problem becomes particularly significant when the molecular weight of the silicone polymer is as high as that of a so-called gum.

Attempts have been made to overcome these problems by carrying out the polymerisation in the presence of the filler. U.S. Pat. No. 4,448,927 discloses a method of polymerising a hydroxy-endblocked polydiorganosiloxane and/or a polydiorganocyclosiloxane in the presence of an acidic or neutral reinforcing filler and catalysed by trifluoromethane sulphonic acid. EP-A-0 119 816 discloses a method of bulk polymerisation of a hydroxy-endblocked polydiorganosiloxane and/or a polydiorganocyclosiloxane in the presence of an acidic or neutral reinforcing filler and catalysed by sulphuric acid or a sulphonic acid. EP-A-0 119 092 discloses a method of polymerising a hydroxy-endblocked polydiorganosiloxane in the presence of an inorganic reinforcing or extending filler and a basic diorganosilanolatecatalyst. U.S. Pat. No. 4,431,771 discloses the polymerisation of a hydroxy-endblocked polydiorganosiloxane in the presence of an acidic or neutral reinforcing filler and a catalyst selected from sulphuric acid, sulphonic acids, perfluorinatedalkane sulphonic acid, and a combination of quaternary ammonium carboxylate and carboxylic acid. While these processes have been successful with linear starting materials, they have been less successful with cyclosiloxanes, as the rates of polymerisation have generally been regarded as too slow.

Phosphazene bases are known to be extremely strong bases. Numerous phosphazene bases and routes for their synthesis have been described in the literature, for example in Schwesinger et al, Liebigs Ann. 1996, 1055–1081.

The use of a phosphazene base catalyst for the ring-opening polymerisation of a cyclosiloxane on a laboratory scale has been described in Molenberg and Möller, Macromol Rapid Commun. 16, 449–453 (1995). Octamethylcyclotetrasiloxane(D4, where D denotes an —Si$(CH_3)_2$O— unit) was polymerised in toluene solution in the presence of methanol and the phosphazene base I (FIG. 1), used as a 1 molar solution in hexane. All the components were carefully dried before the reaction, which was carried out under an argon atmosphere containing less than 1 ppm $O_2$ and $H_2O$. The methanol was deprotonated by the phosphazene base to form methoxide ions which initiate the reaction. A similar reaction system has been used by Van Dyke and Clarson in Poly Prep ACS Div Polym Chem 1996, 37, 668. In this case, tetraphenyltetramethylcyclotetrasiloxane the phenylmethyl analogue of D4, was polymerised. The catalyst system was the same as in Molenberg and Möller, and again all the reaction components were carefully dried beforehand. No fillers were present in any of these reactions and the phosphazene base catalysts were used in an amount of more than 800 ppm based on the weight of D4.

We have found that phosphazene base catalysts are well suited for polymerisation of cyclosiloxanes in the presence of fillers. We have also found that the hexane/methanol activated catalyst can give erratic polymerisation behaviour. We have therefore additionally sought a catalyst medium that gives reproducible polymerisation, preferably without the need for solvent. We have surprisingly found that it is possible to carry out the ring-opening polymerisation of cyclosiloxanes with a phosphazene base catalyst in the presence of fillers and of water. In the simplest case, sufficient water can be provided simply by taking no special steps to dry the filler or the cyclosiloxane starting material. To ensure the presence of water it is sufficient to avoid totally anhydrous conditions. Very small amounts of water, e.g. a few molecules, have been found to suffice to allow the polymerisation to take place. Furthermore, we have found that it is not essential to form a methoxide ion, e.g. by using methanol, in contrast to the prior art teaching.

The present invention thus provides a process for producing a silicone polymer-filler mixture, which comprises effecting the ring-opening polymerisation of a cyclosiloxane with a phosphazene base in the presence of a filler and of water.

The invention yields a silicone polymer-filler mixture suitable for use as an electrical insulation grease, sealants or as a reinforced polymer mixture useful in producing silicone elastomers.

The phosphazene base reacts with trace quantities of water present to form highly active hydroxide ions which initiate the polymerisation. The phosphazene base will also react with certain other chemical groups which may be present, e.g. silanol or alcohol, to form similarly active polymerisation-initiating species. The phosphazene base may be in ionic form, with a strong anion such as fluoride or hydroxide, which is active in initiating polymerisation.

As the phosphazene base is a very powerful catalyst for the polymerisation, it can be present in a relatively low proportion, for example from 1–750 ppm by weight, based on the weight of cyclosiloxane. A preferred range is 10–500 ppm, more preferably 10–100 ppm. The proportion of catalyst actually used will be selected depending on the polymerisation product that is sought.

The proportion of water present in the reaction is preferably at least 0.5 mol, more preferably from 0.5–10 mols per mol of phosphazene base, most preferably from 1 mol-10 mols per mol of phosphazene base. It is possible to employ higher proportions of water, and this can have the benefit of enabling greater control over the polymerisation reaction, as described in more detail below.

In principle, any phosphazene base is suitable for use in the present invention. Phosphazene bases have the following core structure P=N—P=N, in which free N valencies are linked to hydrogen, hydrocarbon, —P=N or =P—N, and free P valencies are linked to —N or =N. A wide range of suitable phosphazene bases has been described in Schwesinger et al (see above). Some phosphazene bases are commercially available from Fluka Chemie AG, Switzerland. The phosphazene bases preferably have at least 3 P-atoms. Some preferred phosphazene bases are of the following general formulae:

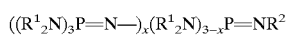

or

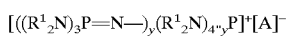

in which $R^1$, which may be the same or different in each position, is hydrogen or an optionally substituted hydrocarbon group, preferably a $C_1$–$C_4$ alkyl group, or in which two $R^1$ groups bonded to the same N atom may be linked to complete a heterocyclic ring, preferably a 5- or 6-membered ring; $R^2$ is hydrogen or an optionally substituted hydrocarbon group, preferably a $C_1$–$C_{20}$ alkyl group, more preferably a $C_1$–$C_{10}$ allyl group; x is 1, 2 or 3, preferably 2 or 3; y is 1, 2, 3 or 4, preferably 2, 3 or 4; and A is an anion, preferably fluoride, hydroxide, silanolate, alkoxide, carbonate or bicarbonate.

In particularly preferred compounds, $R^1$ is methyl, $R^2$ is tert butyl or tert octyl, x is 3, y is 4 and A is fluoride or hydroxide. A preferred compound is the phosphazene base I shown in FIG. 1.

The polymerisation can be carried out in bulk, or in the presence of a solvent or in emulsion. Suitable solvents are liquid hydrocarbons or silicone fluids. The phosphazene base catalyst can be diluted in a hydrocarbon solvent, such as hexane or heptane, or dispersed in a silicone fluid such as polydiorganosiloxane. Where the phosphazene base catalyst is initially in a solvent such as hexane, the hexane can be removed by evaporation under vacuum, and the catalyst dispersed in a silicone fluid to give a stable clear solution. When this silicone dissolved catalyst is used for polymerisation reactions, the catalyst disperses evenly and gives reproducible results. The catalyst can also be dissolved in water, and this has the advantage of moderating and enabling greater control over the polymerisation reaction, as described below.

The polymerisation reaction can be carried out at ambient temperature or under heating. Heating, for example to 100° C. or higher, is appropriate when the catalyst activity has been moderated as described below. A preferred temperature range is 40° C. to 200° C., more preferably 50° C. to 150° C. The time taken for polymerisation will depend on the activity of the catalyst in the chosen system, and on the desired polymer product. In the absence of moderation, the phosphazene base catalysts are sufficiently active to convert cyclosiloxanes such as D4 to high molecular weight polymers within a few seconds.

The starting material is a cyclosiloxane (also known as a cyclic siloxane). Cyclic siloxanes which are useful are well known and commercially available materials. They have the general formula $(R_2SiO)_n$, wherein R denotes hydrogen or an optionally substituted alkyl, alkenyl, aryl, alkaryl or aralkyl group having up to 8 carbon atoms, n denotes an integer with a value of from 3 to 12. R can be substituted, e.g. by halogen such as fluorine or chlorine. The alkyl group can be, for example, methyl, ethyl, n-propyl, trifluoropropyl, n-butyl, sec-butyl, and tert-butyl. The alkenyl group can be, for example, vinyl, allyl, propenyl, and butenyl. The aryl and aralkyl groups can be, for example, phenyl, tolyl, and benzoyl. The preferred groups are methyl, ethyl, phenyl, vinyl, and trifluoropropyl. Preferably at least 80% of all R groups are methyl or phenyl groups, most preferably methyl. It is most preferred that substantially all R groups are methyl groups. Preferably the value of n is from 3 to 6, most preferably 4 or 5. Examples of suitable cyclic siloxanes are octamethyl cyclotetrasiloxane, decamethyl pentacyclosiloxane, cyclopenta (methylvinyl) siloxane, tetramethyltetravinylcyclotetrasiloxane, cyclotetra (phenylmethyl) siloxane and cyclopenta methylhydrosiloxane. One particularly suitable commercially available material is a mixture of octamethylcyclotetrasiloxane and decamethylcyclopentasiloxane.

Where R is methyl, the compound is referred to as Dn; for example, where n=4 the compound is called D4.

The reaction mixture is generally purged with inert gas, preferably nitrogen, prior to addition of the catalyst so as to remove any dissolved $CO_2$. Because of the extremely rapid reaction, the reaction mixture is vigorously mixed to ensure homogenous dispersion of the catalyst. Inadequate mixing can result in the catalyst being encapsulated in beads of gum as it is added to the reaction, and the catalyst then takes some time to diffuse out of the gum particles, giving a slower reaction.

The process according to the invention can be used to make polymers of high molecular weight, for example from $1\times10^4$ to $10\times10^6$. The molecular weight which is given as number average, unless otherwise indicated, of silicone polymers is limited by the concentration of end groups and in the absence of added end groups is determined by the catalyst concentration. The catalyst used in the present invention has sufficient activity to give polymers in a reasonable time at a low concentration even in the presence of fillers. Uses of these high molecular weight polymers with fillers include high consistency rubber, and sealants. We have found that phosphazene base catalysts when used at very low concentrations (10–500 ppm) produce polymers with very high molecular weights (10,000–10,000,000) very quickly (10 s–8 h) at moderate to low temperatures (20–150° C.). Molecular weight changes during polymerisation can be monitored by sampling the reaction during polymerisation, and analysing each sample by GPC (gel permeation chromatography) to determine the molecular weight. Polymers of very high molecular weights can be obtained almost immediately. The process can be used to produce ultra high molecular weight materials. This is by virtue of the very low catalyst concentrations needed for the polymerisation, with the result that the molecular weight of the polymer produced is dependent on the end group concentration which is equal to the catalyst concentration. We have found that at very low catalyst concentrations, such as 20 ppm, the molecular weight increases with reaction time. The process may be limited by diffusion of the catalyst, which is very slow in these high molecular weight polymers.

An endblocker may be added in a proportion calculated to produce the desired molecular weight of polymer. Suitable endblockers are, for example, polysiloxanes in the viscosity range at 25° C. of from 0.5 to 150,000 mm²/s, in particular hexamethyldisiloxane or polydimethylsiloxanes of the general formula $MD_xM$ where M is trimethylsilyl, D is —Si$(CH_3)_2O$— and x has a value of from 0 to 20. The endblocker may have one or more functional groups such as hydroxy, vinyl or hydrogen. Water also acts as a endblocker, with the introduction of hydroxy functional groups.

When the desired polymer has been formed, it is usually desirable to neutralise the catalyst to stabilise the product and prevent any further reaction. Suitable neutralising agents are acids such as acetic acid, silyl phosphate, polyacrylic acid, chlorine substituted silanes, silyl phosphonate or carbon dioxide.

We have found during preparation of the phosphazene base catalysts that air reacts very rapidly with the catalyst solutions giving a hazy material which eventually leads to an insoluble liquid phase. This is believed to be due to the reaction of the catalyst with water and/or $CO_2$ to form an insoluble hydroxide or carbonate salt. We have also found that this deactivation of the catalyst can be reversed e.g. by heating, purging with inert gas or subjecting it to reduced pressure. This makes it possible to moderate or control the polymerisation reaction. This is particularly advantageous in view of the very rapid reaction which occurs when the catalyst is not moderated. Because of the very low levels of catalyst employed in these reactions (which can be as low as 20–50 ppm), the reaction with water and $CO_2$ needs to be taken into account to control the reaction and to obtain reproducible results. By dissolving the phosphazene base in water, in which it is very soluble and very stable, the catalyst activity becomes much more controllable and the polymers produced are of lower molecular weight. This is caused by the water acting as a catalyst inhibitor and also as an endblocker. The inhibiting effect of the water can be reduced by reducing the amount of water present, e.g. by heating. At temperatures below 100° C. the rate of polymerisation in the presence of water or $CO_2$ is relatively slow, for example taking up to more than 24 hours to reach high viscosity. At temperatures above 100° C. (e.g. 100–150° C.), polymerisation becomes much faster, for example taking up to 5–60 minutes to reach high viscosity. Such control of the reaction can also be achieved if the water is mixed with, or replaced by alcohol, (e.g. $C_1$–$C_6$ alcohols such as methanol or ethanol).

We have also found that polymerisation can be prevented by exposing a mixture of cyclosiloxane and phosphazene base catalyst to air and/or $CO_2$. The polymerisation can then be initiated ("command polymerisation") simply by removing the air and/or $CO_2$, e.g. by heating the mixture (e.g. to 100° C.–140° C. for a few minutes). A D4 catalyst mixture (2–50 ppm of catalyst) is stable in air at 20° C. for extended periods (up to 7 days).

Prior methods for the synthesis of siloxane polymers by ring-opening equilibration polymerisation produced products which may typically consist of small cyclics (5–10% D4–D10), macrocyclics (5–10% D11–D50) and polymer (80–90%). The present invention makes it possible to produce polymers by ring-opening polymerisation which have low levels of macrocyclics. By the use of the phosphazene base catalysts in the ring opening polymerisation of e.g. D4 according to the present invention, it is possible to produce polymers that contain less than 1% total by weight of macrocyclics.

Thermogravimetric analysis (TGA) of the polymers produced according to the invention shows that they have enhanced thermal stability. High molecular weight gums have been produced with decomposition onset temperatures of more than 450° C. The enhanced thermal stability is attributed to the very low levels of catalyst residues remaining in the product. The low catalyst residues also mean that a filtration step is usually not necessary, which is a very significant process advantage.

The filler used in the invention, depending on the type, plays the role of rheological control additive, reinforcer, extender or agent for imparting conductivity, etc. The filler may be a reinforcing filler such as fumed silica, precipitated silica, gel-formation silica, fumed titanium dioxide or carbon black; or an extending filler such as quartz powder, alumino silicate, aluminium oxide, zirconium silicate, magnesium oxide, zinc oxide, talc, diatomaceous earth, iron oxide, calcium carbonate, clay, titanium dioxide, mica, glass powder or graphite.

Preferred fillers are finely divided reinforcing fillers for silicone elastomers. Examples of such fillers include carbon black; amorphous silica such as fumed silica, precipitated silica, gel-formation silica, diatomaceous earth, and fumed titanium dioxide. The reinforcing fillers have particle sizes in the colloidal range and specific surface areas greater than 50 m²/g, usually above 150 m²/g. The most useful reinforcing filler is fumed silica with a specific surface area of at least 150 m²/g. Silica fillers are preferably surface-treated by hydrophobising agents. Suitable hydrophobising agents include short polydimethyl siloxanes, hexamethyldisiloxane, silanes, silanol-endblocked dimethyl siloxanes or fatty acids. Preferably hydrophobising agents are used which result in di- or triorgano silyl groups being present on the surface of the fillers.

The quantity of filler used depends on the type of filler and on the application of the silicone polymer-filler mixture. A strongly reinforcing filler such as fumed silica or precipitated silica will generally be employed at from 1 to 70 weight parts per 100 weight parts total cyclosiloxane. The highest reinforcing performance is obtained for this range of addition. Other fillers may be used at from 1 to 200 weight parts per 100 weight parts total cyclosiloxane, but the optimal quantity is appropriately determined by experiment. The filler may be a single filler or two or more fillers may be used simultaneously, whether they be all reinforcing, all extending or a mixture of both types of fillers.

The silicone polymer-filler mixtures produced by the method of this invention are useful in producing curable compositions which yield cured silicone elastomer. They can be used in a manner similar to conventional mixtures of high viscosity polydiorganosiloxanes and fillers. A common method is the addition of an organic peroxide vulcanising agent to a filled polydiorganosiloxane mixture. The organic peroxide vulcanising agents suitable for use in silicone elastomers are well known. If the polydiorganosiloxane does not contain any vinyl radicals, it preferably is vulcanised with organic peroxides that are efficient in causing reactions in such polydiorganosiloxanes. Such organic peroxides are labelled "non-vinyl specific" and are represented by such organic peroxides as benzoylperoxide and 2,4-dichlorobenzoylperoxide. If the polydiorganosiloxane contains vinyl radicals, it can be vulcanised with either "non-vinyl specific" or "vinyl specific" organic peroxides. Representative of the vinyl specific organic peroxides are ditertiary-butyl peroxide and 2,5-bis-(tertbutylperoxy)-2,5-dimethylhexane. The properties of the cured silicone elastomer can be altered by the type and amount of vulcanising agent used to cure the composition. Typical changes due to such choices are well recognised in the art. The organic peroxide vulcanising agent can be present in amounts from 0.1 to 5 parts by weight per 100 parts by weight of the filled polydiorganosiloxane, preferably from 0.5 to 2.0 parts by weight.

The embodiments of the method of this invention which give a polymer having hydroxyl groups on the ends can be further mixed with curing agents to yield curable compositions. A number of methods are known for combining hydroxyl-containing polydiorganosiloxane in an essentially anhydrous mixture with a curing agent to yield a one part curable composition. The compositions cure to silicone elastomers upon exposure to the atmosphere. Methods are available based upon tri-functional and tetra-functional silanes as crosslinking agents as well as short polymeric crosslinkers. Among the functional groups used are acetoxy radicals, alkoxy radicals, amino radicals and amido radicals. Common catalysts for these systems include metal carboxylates, alkyl metal carboxylates, alkyl metal alkoxides and titanates. Preferred catalysts are stannous octoate, dibutyltindiacetate, dibutyltindilaurate, tetrabutyltitanate, dibutyl-tindimethoxide and tetraisopropyltitanate.

Silicone polymer-filler mixture containing two or more unsaturated monovalent aliphatic radicals per polymer molecule such as vinyl and allyl radicals can be combined with a curing agent comprising an organohydrogensiloxane having an average of more than two silicon-bonded hydrogen atoms per molecule, and a hydrosilylationcatalyst, e.g. a platinum-containing catalyst in an amount sufficient to provide at least one part by weight platinum per million parts by weight polydiorganosiloxane. The organohydrogensiloxane is present in sufficient quantity to provide from at least one silicon-bonded hydrogen atom per unsaturated monovalent aliphatic radical in the polydiorganosiloxane. The polydiorganosiloxane in the mixture preferably contains from 0.01 to 2.0 mol percent unsaturated monovalent aliphatic radical.

The silicone polymer-filler mixture of this invention can also be combined with the additives normally used with silicone polymer-filler mixtures such as thickeners, pigments, heat stability additives, oil resistance additives and flame retarding additives.

The following Examples illustrate the invention. Unless stated otherwise, all parts and percentages are by weight, and the phosphazene base used is that of formula I shown in FIG. 1 (commercially available from Fluka, catalogue number 79421). Plasticity was measured according to ASTM D926 protocol and results are expressed in mm.

EXAMPLE 1

Preparation of Phosphazene Base Solution in Siloxane Fluid

A mixture of 1.33 g of hexamethyldisiloxane and 48.67 g of octamethylcyclotetrasiloxane was degassed in a schlenk flask by bubbling nitrogen gas through the solution for a period of 2 hours. To the solution was then added 1 ml of a 1.0 M solution in hexane of phosphazene base I. The solution viscosity immediately began to rise with stirring. After equilibration at room temperature for 24 hours, the mixture was ready for use as the catalyst solution for the subsequent polymerisation of dimethyl cyclosiloxanes in the presence of filler.

EXAMPLE 2

Polymerisation of D4 Cyclics in the Presence of MS75D Fumed Silica

Into a 250 ml round bottom flask equipped with a mechanical stirrer was added 100 g of octamethylcyclotetrasiloxane and 3 g of Cabot MS75D fumed silica. The flask was heated to 100° C. and purged by bubbling nitrogen gas through the solution for a period of one hour. The solution was cooled to 60° C. and 0.2 ml of the phosphazene base solution added with rapid stirring of the mixture. Polymerisation began immediately and a very viscous gum was obtained in 2 minutes. After heating to 150° C. with a nitrogen purge and cooling to room temperature a gum with a plasticity of 236 was obtained.

EXAMPLE 3

Polymerisation of D4 Cyclics in the Presence of Hydrophobic Fumed Silica

Into a 250 ml round bottom flask equipped with a mechanical stirrer was added 120 g of octamethylcyclotetrasiloxane, 5 g of tetramethyltetravinylcyclotetra-siloxane and 43 g of Wacker H2000 fumed silica The flask was heated to 100° C. and purged by bubbling nitrogen gas through the solution for a period of one hour. The solution was cooled to 60° C. and 2 ml of the phosphazene base solution added with rapid stirring of the mixture. Polymerisation began immediately and a very viscous gum was obtained in 2 minutes. After heating to 150° C. with a nitrogen purge and cooling to room temperature a gum with a plasticity of 314 was obtained.

EXAMPLE 4

Polymerisation of D4 Cyclics in the Presence of Hydrophobic Fumed Silica

Into a 250 ml round bottom flask equipped with a mechanical stirrer was added 100 g of octamethylcyclotetrasiloxane, 5 g of tetramethyltetravinylcyclotetra-siloxane and 20 g of Cabot MS75D silica previously treated with a 1.25:1 mixture of hexamethyldisilazane and trimethylchlorosilane. The flask was heated to 100° C. and purged by bubbling nitrogen gas through the solution for a period of one hour. The solution was cooled to 60° C. and 0.6 ml of the phosphazene base solution added with rapid stirring of the mixture. Polymerisation began immediately and a very viscous gum was obtained within 2 minutes. After heating to 150° C. with a nitrogen purge and cooling to room temperature a gum with a plasticity of 354 was obtained.

EXAMPLE 5

Polymerisation of D4 Cyclics in the Presence of Hydrophobic Fumed Silica

Into a 250 ml round bottom flask equipped with a mechanical stirrer was added 120 g of octamethylcyclotetrasiloxane and 24 g of Cabot MS75D silica previously treated with a 1.25:1 mixture of hexamethyldisilazane and trimethylchlorosilane. The flask was heated to 100° C. and purged by bubbling nitrogen gas through the solution for a period of one hour. The solution was cooled to 60° C. and 2 ml of the phosphazene base solution added with rapid stirring of the mixture. Polymerisation began immediately and a very viscous gum was obtained in within 5 minutes. After heating to 150° C. with a nitrogen purge and cooling to room temperature a gum with a plasticity of 376 was obtained.

EXAMPLE 6

Polymerisation of D4 Cyclics in the Presence of Hydrophobic Fumed Silica

Into a 250 ml round bottom flask equipped with a mechanical stirrer was added 120 g of octamethylcyclotetrasiloxane, 5 g of tetramethyltetravinylcyclotetra-siloxane. 0.38 g hexamethyldisiloxane and 15 g of Degussa R972 treated silica. The flask was heated to 100° C. and purged by bubbling nitrogen gas through the solution for a period of one hour. The solution was cooled to 60° C. and 1 ml of the phosphazene base solution added with rapid stirring of the mixture (in this case the ratio of end-blocking functionality to cyclics was controlled so as to obtain a theoretical number average molecular weight of 50,000). Polymerisation began immediately after catalyst addition and a very viscous gum was obtained in within 5 minutes. The gum was then heated to 150° C. with a nitrogen purge and cooled to room temperature. A portion of the gum was isolated and extracted with toluene. The extract was analyzed by GPC (gel permeation chromatography) and found to contain polydimethylsiloxane with a number average molecular weight of 25,000 relative to polystyrene standards.

EXAMPLE 7

Polymerisation of D4 Cyclics in the Presence of Calcium Carbonate

Into a 250 ml round bottom flask equipped with a mechanical stirrer was added 100 g of octamethylcyclotetrasiloxane and 10 g of Rhône-Poulenc Calofort U Calcium carbonate. The flask was heated to 100° C. and purged by bubbling nitrogen gas through the solution for a period of one hour. At 100° C., 0.3 ml of the phosphazene base solution was added to the rapidly stirring mixture. Polymerisation began soon afterwards to yield a viscous fluid in 5 minutes. The fluid was heated to 150° C. with a nitrogen purge and cooled to room temperature.

EXAMPLE 8

Polymerisation of D4 Cyclics in the Presence of Treated Calcium Carbonate

Into a 250 ml round bottom flask equipped with a mechanical stirrer was added 100 g of octamethylcyclotetrasiloxane and 10 g of Rhône-Poulenc Calofort SE calcium stearate (3%) treated calcium carbonate. The flask was heated to 100° C. and purged by bubbling nitrogen gas through the solution for a period of one hour. At 100° C., 0.3 ml of the phosphazene base solution was added to the rapidly stirring mixture. Polymerisation began soon afterwards to yield a gum in 5 minutes. After heating to 150° C. with a nitrogen purge and cooling to room temperature a gum with a plasticity of 119 was obtained.

That which is claimed is:

1. A process for producing a silicone polymer-filler mixture, which comprises effecting the ring-opening polymerisation of a cyclosiloxane with a phosphazene base in the presence of a filler and of water.

2. A process according to claim 1, in which polymerisation is carried out in the presence of at least 0.5 mol of water per mol of phosphazene base.

3. A process according to claim 2, in which water is present in an amount of from 0.5–10 mols per mol of phosphazene base.

4. A process according to claim 1, in which the phosphazene base is present in an amount of from 1–750 ppm by weight, based on the weight of cyclosiloxane.

5. A process according to claim 1, in which the phosphazene base is present in an amount of from 10–100 ppm by weight, based on the weight of cyclosiloxane, and water is present in an amount of at least 1 mol per mol of phosphazene base.

6. A process according to claim 1, in which the polymerisation is carried out at a temperature of from 40° C. to 200° C.

7. A process according to claim 1, in which the phosphazene base is selected from the group consisting of phophazene bases of the general formula (I):

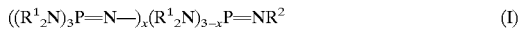

of phophazene bases of the general formula (II):

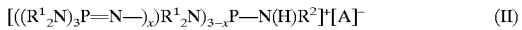

of phophazene bases of the general formula I (III):

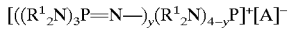

in which each $R^1$ is independently selected from the group consisting of hydrogen, a hydrocarbon group, and a halogen substituted hydrocarbon group, and of phophazene bases of the general formulae (I), (II), or (III) in which two $R^1$ groups bonded to the same N-atom are linked to complete a heterocyclic ring; and each $R^2$ is independently selected from the group consisting of hydrogen, a hydrocarbon group, and a halogen substituted hydrocarbon group; x is 1, 2 or 3; y is 1, 2, 3 or 4; and A is an anion.

8. A process according to claim 1, in which the cyclosiloxane is of the general formula $(R_2SiO)_n$, wherein each R is independently selected from the group consisting of hydrogen, a $C_{1-8}$ alkyl, a $C_{1-8}$ alkenyl, a $C_{6-8}$ alkaryl, a $C_{6-8}$ aralkyl, a halogen substituted $C_{1-8}$ alkyl, a halogen substituted $C_{1-8}$ alkenyl, a halogen substituted $C_{6-8}$ aryl, a halogen substituted $C_{6-8}$ alkaryl and a halogen substituted $C_{6-8}$ aralkyl, and n denotes an integer with a value of from 3 to 12.

9. A process according to claim 1, in which the filler is a filler selected from the group consisting of silica, alumina, titanium dioxide, carbon black and calcium carbonate.

10. A process according to claim 9, in which the silica is selected from the group consisting of fumed silica, precipitated silica and ground quartz.

11. A process according to claim 10, in which the surface of the silica has been made hydrophobic.

12. A process according to claim 1, in which the filler is present in an amount of from 1 to 200 parts by weight per 100 parts by weight of cyclosiloxane.

13. A process according to claim 1, in which an agent which inhibit catalyst activity is initially present, and in which polymerisation is initiated by reducing the effect of the inhibiting agent.

14. A process according to claim 1, in which conditions inhibit catalyst activity in the initial stage of the process, and in which polymerisation is initiated by reducing the effect of the inhibiting conditions.

15. A process according to claim 13, in which the inhibiting agent is selected from the group consisting of carbon dioxide, excess water and a mixture of carbon dioxide and excess water, and in which the polymerisation reaction is initiated by heating.

16. A process according to claim 1, in which an end-blocker is present in an amount calculated to result in a desired molecular weight range of polymer.

17. A process according to claim 1, in which polymerisation is terminated by adding a neutralising agent which prevents further catalyst activity.

* * * * *